(12) United States Patent
Li et al.

(10) Patent No.: US 12,517,157 B2
(45) Date of Patent: Jan. 6, 2026

(54) VOLTAGE DETECTION APPARATUS AND METHOD FOR DETERMINING WHETHER HIGH VOLTAGE AT INPUT TERMINAL EXCEEDS PRESET VALUE

(71) Applicant: Hefei Institutes of Physical Sciences, Chinese Academy of Sciences, Anhui (CN)

(72) Inventors: Hua Li, Anhui (CN); Zhiquan Song, Anhui (CN); Xining Zhang, Anhui (CN); Qianglin Xu, Anhui (CN); Meng Xu, Anhui (CN)

(73) Assignee: Hefei Institutes of Physical Sciences, Chinese Academy of Sciences, Hefei (CN)

( * ) Notice: Subject to any disclaimer, the term of this patent is extended or adjusted under 35 U.S.C. 154(b) by 203 days.

(21) Appl. No.: 18/450,912

(22) Filed: Aug. 16, 2023

(65) Prior Publication Data
US 2024/0069076 A1 Feb. 29, 2024

(30) Foreign Application Priority Data

Aug. 22, 2022 (CN) .......................... 202211004252.2

(51) Int. Cl.
*G01R 19/165* (2006.01)
(52) U.S. Cl.
CPC . *G01R 19/16523* (2013.01); *G01R 19/16538* (2013.01); *G01R 19/16557* (2013.01)
(58) Field of Classification Search
CPC ........ G01R 19/16523; G01R 19/16538; G01R 19/16557; G01R 15/22; G01R 19/16576;
(Continued)

(56) References Cited

U.S. PATENT DOCUMENTS 4,244,340 A 1/1981 Herth et al.
4,567,476 A 1/1986 Lang
(Continued)

FOREIGN PATENT DOCUMENTS

CN 101686044 A 3/2010
CN 102290969 A 12/2011
(Continued)

OTHER PUBLICATIONS

Rao Junfeng et al., "Study on High-Voltage Square Wave Pulse Generator Based on Series Switches and Time-Delay Drive," J. University of Shanghai for Science and Technology, vol. 41. No. 6, 2019, p. 7.
(Continued)

*Primary Examiner* — Feba Pothen
(74) *Attorney, Agent, or Firm* — Seed IP Law Group LLP

(57) ABSTRACT

The present disclosure relates to a voltage detection apparatus and method for determining whether a high voltage at an input terminal exceeds a preset value. The device includes a high-voltage arm and a low-voltage arm, and the low-voltage arm includes a capacitor charging/discharging module, a signal indication module, a threshold selection module, a control module, a signal transmission module, and a signal processing module. The high-voltage arm includes a precision resistor R1, the capacitor charging/discharging module includes a charging/discharging capacitor C1 and a diode VD2, the signal indication module includes an optical-fiber emitting diode V1 and a voltage stabilizing diode VD, the threshold selection module includes four parallel resistors and corresponding switch contacts S1, S2, S3, and S4 thereof, the control module includes a comparator D1 and a transistor switch VT1 controlled by D1, and the signal transmission module includes one optical-fiber emitting diode V2 and one optical-fiber emitting diode V3 connected
(Continued)

Signal processing in series; the signal processing module is an upper computer or an optical signal acquisition system. The apparatus in the present disclosure has a long-term high voltage resistance, detects a high voltage at an input terminal, compares the same with a threshold voltage, and transmits and displays a comparison result, so as to provide a logical basis of determination for reliable operation of a circuit breaker.

5 Claims, 1 Drawing Sheet

(58) Field of Classification Search
CPC . G01R 31/3274; G01R 31/327; H02M 1/322; H02M 1/44
See application file for complete search history.

(56) References Cited

U.S. PATENT DOCUMENTS

| | | |
|---|---|---|
| 5,558,071 A | 9/1996 | Ward et al. |
| 2006/0181246 A1 | 8/2006 | Hackner et al. |
| 2013/0082762 A1 | 4/2013 | Gan et al. |
| 2016/0062383 A1 | 3/2016 | Nagasawa |
| 2017/0025958 A1 | 1/2017 | Yu et al. |
| 2024/0097551 A1* | 3/2024 | Hartmann ............ H02M 1/007 |

FOREIGN PATENT DOCUMENTS

| | | |
|---|---|---|
| CN | 102998620 A | 3/2013 |
| CN | 103618522 A | 3/2014 |
| CN | 104914293 A | 9/2015 |
| CN | 105119476 A | 12/2015 |
| CN | 106707157 A | 5/2017 |
| CN | 106788366 A | 5/2017 |
| CN | 109245053 A | 1/2019 |
| CN | 110620413 A | 12/2019 |
| CN | 111316130 A | 6/2020 |
| CN | 111510003 A | 8/2020 |
| CN | 213812717 U | 7/2021 |
| CN | 215378762 U | 12/2021 |
| CN | 114336885 A | 4/2022 |
| JP | 2013083519 A | 5/2013 |
| WO | 2021028984 A1 | 2/2021 |

OTHER PUBLICATIONS

Zou Kunying, "500KW shortwave transmitter PSM power link designed and implemented," Science and Technology Vision, 2016, 4 pages.

* cited by examiner

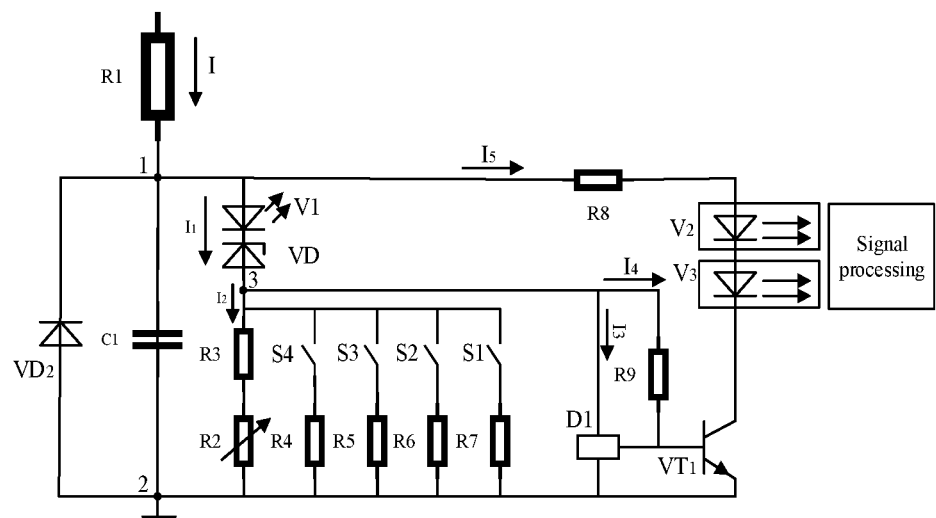
Signal processing

VOLTAGE DETECTION APPARATUS AND METHOD FOR DETERMINING WHETHER HIGH VOLTAGE AT INPUT TERMINAL EXCEEDS PRESET VALUE

TECHNICAL FIELD

The present disclosure relates to the field of electrical measurement and, more particularly, to a voltage detection apparatus and method for determining whether a high voltage at an input terminal exceeds a preset value.

BACKGROUND ART

Direct current (DC) circuit breakers are widely used in DC transmission and distribution, rail transit and other fields, and are a crucial connection device for stable and reliable operation of the system. When a DC circuit breaker breaks a fault current, it is necessary to monitor the state of operation of a main switch in real time and send a state signal to a central controller to find a matching protection strategy. The difficulties in monitoring lie in that a common voltage detection apparatus can only detect a specific voltage value, without a comparison function; to determine an action logic of a circuit breaker, it is necessary to input a voltage signal into an upper computer for comparison and then output a comparison result signal; however, to realize such a function, a complicated structure and a redundant process are unavoidable.

SUMMARY OF THE INVENTION

In order to overcome the shortcomings and deficiencies of the prior art, the present disclosure provides a voltage detection apparatus for determining whether a high voltage at an input terminal exceeds a preset value, which is used for determining the action logic of a circuit breaker, and can not only compare the input high voltage and a threshold voltage and visually display a comparison result to transmit a signal, but also can endure a high-voltage impact for a long time, thereby solving the problem of damaging a low-power device by a high voltage; moreover, in the form of an optical-fiber emitting diode and an optical-fiber cable, it is possible to accurately and rapidly transmit signals without being affected by external electromagnetic interference.

The technical solution proposed by the present disclosure to solve the technical problem is as follows.

A voltage detection apparatus for determining whether a high voltage at an input terminal exceeds a preset value, including a high-voltage arm and a low-voltage arm, wherein the low-voltage arm includes a capacitor charging/discharging module, a signal indication module, a threshold selection module, a control module, and a signal transmission module; the high-voltage arm includes a precision resistor R1; the capacitor charging/discharging module includes a charging/discharging capacitor C1 and a diode VD2; the signal indication module includes an optical-fiber emitting diode V1 and a voltage stabilizing diode VD; the threshold selection module includes four parallel resistors R4, R5, R6, and R7 and corresponding switch contacts S1, S2, S3, and S4; the control module includes a comparator D1 and a transistor switch VT1 controlled by the comparator D1; the signal transmission module includes one optical-fiber emitting diode V2 and one optical-fiber emitting diode V3 that are connected in series, and once the transistor switch VT1 is turned on, a current pulse passes through the optical-fiber emitting diode V2 and the optical-fiber emitting diode V3, and an optical pulse appears in an optical-fiber cable as an output signal; the signal processing module is an upper computer or an optical signal acquisition system for receiving or processing optical signals emitted by the optical-fiber emitting diode V2 and the optical-fiber emitting diode V3; the high voltage at the input terminal flows into the low-voltage arm of a circuit via the high-voltage arm, and is connected via a first node; the charging/discharging capacitor C1 is connected to the diode VD2 via the first node and a second node; the optical-fiber emitting diode V1 and the voltage stabilizing diode VD of the signal indication module are connected in series, with a terminal connected to the first node and another terminal connected to the second node; the threshold selection module is connected in parallel to two terminals of the resistor R2 and the resistor R3 via the second node and a third node; a terminal of the comparator D1 is connected to a base of the transistor switch VT1, and other two terminals are connected in parallel to the threshold selection module via the second node and the third node; the optical-fiber emitting diode V2 and the optical-fiber emitting diode V3 are connected in series, with a terminal connected to the first node and a terminal connected to a collector of the transistor switch VT1.

Furthermore, the charging/discharging capacitor C1 forms a charging loop through the diode VD2 when the precision resistor R1 samples.

Furthermore, a threshold of an input voltage depends on a closed state of the switch contact S1, the switch contact S2, the switch contact S3, and the switch contact S4 and a value of the resistance in series connection with the switch contacts.

The present disclosure further provides a detection method employed by the voltage detection apparatus for determining whether a high voltage at an input terminal exceeds a preset value, including:

step 1, inputting a to-be-detected voltage U1 into a high-voltage arm of the detection apparatus, and letting a threshold voltage thereof be U;

step 2, not turning on a control part of the low-voltage arm in a case of U1<U, with the charging/discharging capacitor C1 being in a charging state;

step 3, turning on the voltage stabilizing diode VD in a case of U1>U, starting a comparator D1 by a voltage on the low-voltage arm, and turning off the transistor switch VT1, with the charging/discharging capacitor C1 being in a discharging state, where the current pulse flows through the optical-fiber emitting diode V2 and the optical-fiber emitting diode V3, and an optical signal is transmitted to the signal processing module through the optical-fiber cable; turning off the comparator D1, turning on the transistor switch VT1, where the current pulse no longer passes through the optical-fiber emitting diode V2 and the optical-fiber emitting diode V3, and the charging/discharging capacitor C1 is in the charging state until the comparator D1 reaches the threshold voltage, in which case the transistor switch VT1 is turned off, the charging/discharging capacitor C1 goes back to the discharging state, and the optical-fiber emitting diode V2 and the optical-fiber emitting diode V3 repeatedly generate the optical pulse; and generating a periodic pulse sequence by the low-voltage arm; and step 4, turning on the voltage stabilizing diode VD in a case of U1=U, with the voltage on both terminals of the comparator D1 being in a critical state; decreasing an overall resistance of the low-voltage arm part in a case where one or more of the switch contact S1, the switch contact S2, the switch contact S3, and the switch contact S4 are in the closed state, in which case the voltage on both terminals of the comparator D1 decreases, which is insufficient to start the comparator D1, and the threshold voltage U has increased; and restarting the comparator D1 after U1 increases.

The advantageous effects of the present disclosure are as follows. According to the detection apparatus of the present disclosure, the transistor switch is taken to control the charging/discharging of the capacitor, the comparator controls the base of the transistor switch, and the collector of the transistor switch is connected to the capacitor, which makes it possible to endure a high voltage, have a large current, and feature a good switching characteristic, thereby accurately reflecting the real situation of the high voltage at the input terminal and the threshold voltage; and the use of the optical-fiber cable to transmit optical signals from optical-fiber emitting diodes gets rid of the external electromagnetic interference and influence.

BRIEF DESCRIPTION OF THE DRAWINGS

FIG. 1 is a schematic diagram showing a structure of a voltage detection apparatus for determining whether a high voltage at an input terminal exceeds a preset value according to the present disclosure.

DETAILED DESCRIPTION OF THE INVENTION

In order that the object, aspects, and advantages of the present disclosure will become more apparent, a more detailed description of the disclosure will be rendered by reference to the embodiments thereof which are illustrated in the appended drawings. It should be understood that the embodiments described herein are illustrative only and are not limiting. Furthermore, the technical features involved in the various embodiments of the present disclosure described below can be combined with each other as long as they do not conflict with each other.

As shown in FIG. 1, the present disclosure discloses a voltage detection apparatus for determining whether a high voltage at an input terminal exceeds a preset value, including a high-voltage arm and a low-voltage arm. The low-voltage arm includes a capacitor charging/discharging module, a signal indication module, a threshold selection module, a control module, a signal transmission module, and a signal processing module. Herein, the high voltage at the input terminal flows into the low-voltage arm of a circuit via the high-voltage arm, and is connected via a first node 1; the charging/discharging capacitor C1 is connected to the diode VD2 via the first node 1 and a second node 2; the optical-fiber emitting diode V1 of the signal indication module is connected in series with the voltage stabilizing diode VD, with a terminal connected to the first node 1 and a terminal connected to the second node 2; the threshold selection module is connected in parallel to two terminals of a resistor R2 and a resistor R3, and is connected via the second node 2 and a third node 3; a terminal of the comparator D1 is connected to a base of a transistor switch, and other two terminals are connected in parallel to the threshold selection module via the second node 2 and a third node 3; the optical-fiber emitting diode V2 and the optical-fiber emitting diode V3 are connected in series, with a terminal connected to the first node 1 and a terminal connected to a collector of the transistor switch. The high-voltage arm is a high-voltage part of the detection apparatus and the low-voltage arm is a low-voltage part of the detection apparatus. Herein, I is an overall current flowing into the apparatus, I1 is a current of the low-voltage part, I2 is a current flowing into the threshold selection module, I3 is a current flowing into the comparator D1, I4 is a current of the base of the transistor switch VT1, and I5 is a current of the collector of the transistor switch VT1.

The high-voltage arm includes a precision resistor R1, where a resistance value of the precision resistor R1 is in the order of MΩ or above, and the precision resistor R1 has a high mechanical strength and a superior high-frequency characteristic, features a quick response, and may endure a long-time high-voltage impact.

The capacitor charging/discharging module includes the charging/discharging capacitor C1 and the diode VD2 connected in parallel thereto, and the optical-fiber emitting diodes V2 and V3, where the diode VD2 is connected in parallel to the charging/discharging capacitor C1, and the charging/discharging capacitor C1 forms a loop when charging. When the charging/discharging capacitor C1 is discharging, the transistor switch VT1 is turned on and forms a loop together with the optical-fiber emitting diode V2 and the optical-fiber emitting diode V3, and the optical-fiber emitting diode V2 and the optical-fiber emitting diode V3 emit optical signals.

The signal indication module includes the optical-fiber emitting diode V1 and the voltage stabilizing diode VD.

The threshold selection module includes four resistors R4, R5, R6, and R7 that are connected in parallel at two terminals of the resistor R2 and the resistor R3 and corresponding switch contacts S1, S2, S3, and S4. A closed state of the switch contacts S1 to S4 determines a selection of threshold of the detection apparatus. As the circumstances may require, the value of the resistor R4 is 5.23 KΩ the value of the resistor R5 is 10.5 KΩ the value of the resistor R6 is 21 KΩ the value of the resistor R7 is 42.2 KΩ and a range of the threshold of the voltage detection apparatus is 3.5 kV to 11.0 kV.

The control module includes the comparator D1 and the transistor switch VT1 controlled by the comparator D1. The two terminals of the comparator D1 are connected in parallel with the two terminals of the resistor of the threshold selection module; if the voltage reaches the threshold of the comparator D1, the base of the transistor switch VT1 is turned on; at the same time, in a capacitor discharging loop, the collector and an emitter of the transistor switch VT1 satisfy a condition for conducting, and the transistor switch VT1 is turned, and the charging/discharging capacitor C1 discharges. After discharging, the voltage of the charging/discharging capacitor C1 decreases, the voltage at both terminals of the comparator D1 decreases and is insufficient to start up, meanwhile, the transistor switch VT1 is in an open state; the discharging capacitor C1 will be charged until the comparator D1 reaches the threshold voltage, at which time the charging/discharging capacitor C1 will discharge again, and an optical pulse will be repeatedly generated.

The signal transmission module includes one optical optical-fiber emitting diode V2 and one optical optical-fiber emitting diode V3 connected in series and an optical-fiber cable transmitting the optical signals thereof. If the voltage at the input terminal of the detection apparatus exceeds the preset value, the capacitor discharging loop is conductive, and the optical-fiber emitting diode V2 and the optical-fiber emitting diode V3 emit the optical signals, and the optical signals are transmitted to the signal processing module via the optical-fiber cable. Optical signals transmitted by the optical-fiber cable can be protected from external electromagnetic interference and influence.

The signal processing module is an upper computer or an optical signal acquisition system for acquiring the optical signals of the optical-fiber emitting diode V2 and the optical-fiber emitting diode V3.

The present disclosure can realize the comparison between the high voltage at the input terminal and the preset value. Here, the to-be-detected voltage at the input terminal on the high-voltage arm is defined as U1, and the preset value of the detection apparatus is defined as U.

1) If U1<U, that is, the input voltage is lower than the preset value,
   then the voltage at both terminals of the comparator D1 is not sufficient to make the same operate, the control part of the low-voltage arm is not turned on, and the capacitor is in a charging state.
2) If U1>U, that is, the input voltage exceeds the preset value,
   then the voltage stabilizing diode VD is turned on, a voltage on the low-voltage arm starts the comparator D1, the transistor switch VT1 is turned on, the charging/discharging capacitor C1 is discharging, a current pulse flows through the optical-fiber emitting diode V2 and the optical-fiber emitting diode V3, and the optical signals are transmitted to the signal processing module via the optical-fiber cable. Thereafter, the comparator D1 is turned off, the transistor switch VT1 is turned on, the current pulse no longer passes through the optical-fiber emitting diode V2 and the optical-fiber emitting diode V3, the charging/discharging capacitor C1 is in a charging state until the comparator D1 reaches the threshold voltage; the transistor switch VT1 is turned off, the charging/discharging capacitor C1 is discharging again, and the optical-fiber emitting diode V2 and the optical-fiber emitting diode V3 repeatedly generate the optical pulse. The low-voltage arm generates a periodic pulse sequence.
3) If U1=U, the voltage stabilizing diode VD is turned on, and the voltage at both terminals of the comparator D1 is in a critical state; when one or more of the switch contacts S1 to S4 are in the closed state, the overall resistance of the low-voltage arm part decreases, and the voltage at both terminals of the comparator D1 decreases, which is insufficient to start the comparator D1. At this time, the threshold voltage U has increased and the comparator D1 will be restarted after U1 increases.

It can be seen from the working principle shown in the present disclosure that this detection method is different from the conventional principle of a comparator in that a method whereby parallel resistors control a threshold voltage and compare the same with a voltage at an input terminal is employed, and a corresponding feedback signal is output via an optical-fiber cable. The detection apparatus here is simple, convenient, and useful in engineering.

The embodiments described above are merely illustrative of the principle and efficacy of the present disclosure, and it will be apparent to those skilled in the art that many changes and modifications can be made to the embodiments applied herein without departing from the inventive concept, and such changes and modifications are intended to be within the scope of the disclosure.

The invention claimed is:

1. A voltage detection apparatus for determining whether a high voltage at an input terminal exceeds a preset value, comprising a high-voltage arm and a low-voltage arm, wherein the low-voltage arm comprises a capacitor charging/discharging module, a signal indication module, a threshold selection module, a control module, and a signal transmission module; the high-voltage arm comprises a precision resistor R1; the capacitor charging/discharging module comprises a charging/discharging capacitor C1 and a diode VD2; the signal indication module comprises an optical-fiber emitting diode V1 and a voltage stabilizing diode VD; the threshold selection module comprises four parallel resistors R4, R5, R6, and R7 and corresponding switch contacts S1, S2, S3, and S4; the control module comprises a comparator D1 and a transistor switch VT1 controlled by the comparator D1; the signal transmission module comprises one optical-fiber emitting diode V2 and one optical-fiber emitting diode V3 that are connected in series, and once the transistor switch VT1 is turned on, a current pulse passes through the optical-fiber emitting diode V2 and the optical-fiber emitting diode V3, and an optical pulse appears in an optical-fiber cable as an output signal; a signal processing module is an upper computer or an optical signal acquisition system for receiving or processing optical signals emitted by the optical-fiber emitting diode V2 and the optical-fiber emitting diode V3; the high voltage at the input terminal flows into the low-voltage arm of a circuit via the high-voltage arm, and is connected via a first node; the charging/discharging capacitor C1 is connected to the diode VD2 via the first node and a second node; the optical-fiber emitting diode V1 and the voltage stabilizing diode VD of the signal indication module are connected in series, with a terminal of the optical fiber emitting diode V1 connected to the first node and another terminal of the optical-fiber emitting diode V1 connected to the second node; the threshold selection module is connected in parallel to two terminals of a resistor R2 and a resistor R3 via the second node and a third node; a terminal of the comparator D1 is connected to a base of the transistor switch VT1, and other two terminals of the comparator D1 are connected in parallel to the threshold selection module via the second node and the third node; the optical-fiber emitting diode V2 and the optical-fiber emitting diode V3 are connected in series, with a terminal of the optical-fiber emitting diode V2 connected to the first node and a terminal of the optical fiber emitting diode V3 connected to a collector of the transistor switch VT1.

2. The voltage detection apparatus for determining whether a high voltage at an input terminal exceeds a preset value according to claim 1, wherein the charging/discharging capacitor C1 forms a charging loop through the diode VD2 when there is a voltage on the precision resistor R1.

3. The voltage detection apparatus for determining whether a high voltage at an input terminal exceeds a preset value according to claim 1, wherein in response to a low-voltage part of the circuit operating normally, the optical-fiber emitting diode V1 is turned on, and a voltage of the voltage stabilizing diode VD remains unchanged.

4. The voltage detection apparatus for determining whether a high voltage at an input terminal exceeds a preset value according to claim 1, wherein a threshold of the input voltage depends on a closed state of the switch contact S1, the switch contact S2, the switch contact S3, and the switch contact S4 and a value of a resistance in series connection with the switch contacts.

5. A detection method employed by the voltage detection apparatus for determining whether a high voltage at an input terminal exceeds a preset value according to any one of claims 1 to 4, comprising:

step 1, inputting a to-be-detected voltage U1 into the high-voltage arm of the detection apparatus, and letting a threshold voltage be U;

step 2, not turning on a control part of the low-voltage arm in a case of U1<U, with the charging/discharging capacitor C1 being in a charging state;

step 3, turning on the voltage stabilizing diode VD in a case of U1>U, starting the comparator D1 by a voltage on the low-voltage arm, and turning off the transistor switch VT1, with the charging/discharging capacitor C1 being in a discharging state, where the current pulse flows through the optical-fiber emitting diode V2 and the optical-fiber emitting diode V3, and an optical signal is transmitted to the signal processing module through the optical-fiber cable; turning off the comparator D1, turning on the transistor switch VT1, where the current pulse no longer passes through the optical-fiber emitting diode V2 and the optical-fiber emitting diode V3, and the charging/discharging capacitor C1 is in the charging state until the comparator D1 reaches the threshold voltage, in which case the transistor switch VT1 is turned off, the charging/discharging capacitor C1 goes back to the discharging state, and the optical-fiber emitting diode V2 and the optical-fiber emitting diode V3 repeatedly generate the optical pulse; and generating a periodic pulse sequence by the low-voltage arm; and step 4, turning on the voltage stabilizing diode VD in a case of U1=U, with the voltage on both terminals of the comparator D1 being in a critical state; decreasing an overall resistance of the low-voltage arm part in a case where one or more of the switch contact S1, the switch contact S2, the switch contact S3, and the switch contact S4 are in the closed state, in which case the voltage on both terminals of the comparator D1 decreases, which is insufficient to start the comparator D1, and the threshold voltage U has increased; and restarting the comparator D1 after U1 increases.

\* \* \* \* \*